United States Patent [19]

Conover

[11] Patent Number: 5,039,427

[45] Date of Patent: Aug. 13, 1991

[54] METHOD OF TREATING LAKE WATER WITH ALUMINUM HYDROXIDE SULFATE

[75] Inventor: Brett R. Conover, Switzerland, Fla.

[73] Assignee: General Chemical Corporation, Parsippany, N.J.

[21] Appl. No.: 540,361

[22] Filed: Jun. 19, 1990

[51] Int. Cl.$^5$ ............................. C02F 1/58; C02F 1/52
[52] U.S. Cl. .................................. 210/702; 210/709; 210/724; 210/747; 210/749; 210/906
[58] Field of Search ................ 210/702, 724, 709, 747, 210/749, 906

[56] References Cited

U.S. PATENT DOCUMENTS

| | | | |
|---|---|---|---|
| 4,507,206 | 3/1985 | Hughes. | |
| 4,818,416 | 4/1989 | Eberhardt | 210/242.1 |
| 4,877,524 | 10/1989 | Eberhardt | 210/242.1 |
| 4,882,072 | 11/1989 | Eberhardt | 210/739 |

FOREIGN PATENT DOCUMENTS 55-3340 1/1980 Japan.

OTHER PUBLICATIONS

Foy, R. H., "Phosphorus Inactivation In A Eutrophic Lake By The Direct Addition Of Ferric Aluminum Sulfate: Impact On Iron And Phosphorus," *Fresh Water Biology FWBLAB*, vol. 17, pp. 1-13 (Feb. 1987).
Foy, R. H., "Phosphorus Inactivation In A Eutrophic Lake By The Direct Addition Of Ferric Aluminum Sulfate: Changes in Phytoplankton Populations," *Fresh Water Biology FWBLAB*, vol. 17, pp. 1-13 (Feb. 1987).
Cooke, G. D., et al., "State-of-the-art Summary of Phosphorus Inactivation As A Lake Restoration Technique,", Proceedings of Workshop Of Algal Management And Control, Mar. 9-12, 1989, Pacific Grove, CA, Technical Report E-A 1-7 (May 1981).
Penz, E., et al., "New Technology For Nutrient Precipitation In Lakes,", Wasserwirtschaft-Wassertechnique, vol. 33, pp. 158-159 (May 1983).
Gibbons, M. V., et al., "Effects Of Multiphase Restoration, Particularly Aluminum Sulfate Application, On The Zooplankton Community Of A Eutrophic Lake in Eastern Washington,", *Journal of Freshwater Ecology*, vol. 2, pp. 393-404 (Apr. 1984).
Buergel, P. M. et al., "The Distribution And Accumulation Of Aluminum In Rainbow Trout Following A Whole-lake Alum Treatment," *Journal of Freshwater Ecology*, vol. 2, pp. 37-44 (Mar. 1983).
Knapp, S. M., et al., "Trout-Zooplankton Relationships In Medical Lake, Washington Following Restoration By Aluminum Sulfate Treatment," *Journal of Freshwater Ecology*, vol. 2, pp. 1-12, (Mar. 1983).
Norvell, W. A., "Feasibility Of Inactivating Phosphorus With Aluminum Salts In Ball Pond, CT," Connecticut *Agricultural Experiment Station Bulletin 806* (Sep. 1982).
Benedek, P., "Increasing The Degree Of Efficacy Of Wastewater Treatment," Gas-Wasserfach Wasser-Abwasser, vol. 122, pp. 572-581 (Dec. 1981).
Cooke, G. D., et al., "Change In Lake Trophic State And Internal Phosphorus Release After Aluminum Sulfate Application," *Water Resources Bulletin*, vol. 18, pp. 699-705 (Aug. 1982).
Kennedy, R. H., et al., "Control of Lake Phosphorus With Aluminum Sulfate: Dose Determination And Application Techniques," *Water Resources Bulletin*, vol. 18, pp. 389-395 (Jun. 1982).
Nyholm, N., et al., "Restoration of Lake Nakskov Indrefjord, Denmark, Using Algal Ponds To Remove Nutrients From Inflowing River Water," *Progress in Water Technology*, vol. 10, pp. 881-892 (1978).
Sonnichsen, T., "Toxicity of A Phosphate-Reducing Agent (Aluminum Sulfate) On The Zooplankton In The Lake Lyngby," Proceedings Of The 20th Congress, International Vereinigung Fur Theoretische Und Angewandte Limnologie, Copenhagen, Denmark (Aug. 8, 1977), vol. 20, pp. 709-713 (Sep. 1978).
Pagel, C. W., et al., "An Investigation Of The Effects Of Pulp And Paper Effluent On The Macrobenthic Community In Southern Lake Champlain, U.S.A.," in: Proceedings Of The 20th Congress, Internationale Vereinigung Fur Theoretische Und Angewandte Limnologie. Copenhagen, Denmark (Aug. 8, 1977), vol. 20, pp. 510-513.
Cooke, G. D., "Evaluation Of Aluminum Sulfate For Phosphorus Control In Eutrophic Lakes," NTIS Report PB-292 (Jan. 1979).
Cooke, G. D., et al., "Effects Of Diversion And Alum Application On Two Eutrophic Lakes," *EPA Report 600/3-78-033 (Mar. 1978)*.
Cooke, G. D., et al., "Limnological And Geochemical Characteristics Of The Twin Lakes," in: North American Project-A Study Of U.S. Water Bodies, EPA Publication No. 600/3-77-086 (Jul. 1977).
Bulson, P. C., et al., "Removal And Inactivation Of Bacteria During Alum Treatment Of A Lake," *Appl. Environ. Microbiol.*, vol. 48, pp. 425-430 (1984).

(List continued on next page.)

*Primary Examiner*—Stanley S. Silverman
*Assistant Examiner*—Neil M. McCarthy
*Attorney, Agent, or Firm*—Brumbaugh, Graves, Donohue & Raymond

[57] ABSTRACT

A method of treating lake water to remove suspended solids and to precipitate and inactivate phosphorus comprises adding aluminum hydroxide sulfate to the water in a concentration such that the pH of the water is maintained at a level of greater than 6.0 and precipitation of suspended solids and precipitation and inactivation of phosphorus occurs. This invention is advantageous in that it provides a method of removing suspended solids as well as precipitating and inactivating phosphorus in water while simultaneously preventing the solublizing of toxic amounts of aluminum into the water with subsequent detrimental effects to aquatic life.

7 Claims, No Drawings

OTHER PUBLICATIONS

Zarini, S., et al., "Effects Produced By Aluminum In Fresh Water Communities Studied By Enclosure Method," Environ. Technol. Lett., vol. 4, pp. 247–256 (1983).

Canfield, C., et al., "Mother Nature As Sludge Thickener," *Water Eng. & Mgmt.*, vol. 129, pp. 22–24 (1982).

"Alum Control Of Internal Phosphorus Loading In A Shallow Lake," Water Resources Bulletin, vol. 18, pp. 929–936 (1982).

"Lake Restoration: A Five-Year Evaluation Of The Mirror And Shadow Lakes; Project Waupaca, WI," (Available from NTIS as PB83-176578).

"The Influence Of Algal Growth And Other Ecological Factors And Reservoirs On The Production And Control Of Trihalo Methane Precursors," (Available from NTIS as PB83-140012).

"Preliminary Assessment Of Multiphase Restoration Efforts At Liberty Lake, WA," (Available from NTIS as PB82-188251).

"Acute and Chronic Effects Of Alum To Midge Larva (Diptera: Chironomidae)," Bulletin Environmental Contamination And Toxicology, vol. 27, pp. 59–67 (1981).

"Precipitation And Inactivation Of Phosphorus As A Lake Restoration Technique," (Available from NTIS as PB81-196511).

"The Application Of Limestone And LimeDust In Abatement Of Acidic Drainage In Centre County, PA,"(Available from NTIS as PB81-180515).

"The Effects Of Calcium, Alum And PH On The Removal Of Naturally Occurring Manganese By Rapid Sand Filtration," (Available from NTIS as PB80-135148).

METHOD OF TREATING LAKE WATER WITH ALUMINUM HYDROXIDE SULFATE

BACKGROUND OF THE INVENTION

This invention relates to a method of treating lake water to remove suspended solids and to precipitate and inactivate phosphorus. More particularly, this invention relates to a method of removing suspended solids and precipitating and inactivating phosphorus contained in lake water comprising adding aluminum hydroxide sulfate to the water in a concentration such that the pH of the water is maintained at a level of greater than 6.0 and precipitation of suspended solids and precipitation and inactivation of phosphorous occurs.

The use of aluminum sulfate compounds to treat lake water for the removal of suspended solids as well as the precipitation and inactivation of phosphorus compounds is well known to those skilled in the art, as illustrated, for example, by Cooke, G. D. et al., "State-of-the-Art Summary of Phosphorus Inactivation as a Lake Restoration Technique," Proceedings of Workshop on Algal Management and Control, Mar. 9-12, 1989, Pacific Grove, Calif., Technical Report E-81-7 (May 1981).

However, the use of aluminum sulfate as an additive has inherent problems when employed in lake water having low alkalinity and low pH, as aluminum sulfate tends to further depress the pH of the entire lake. For example, one mg/liter of aluminum sulfate consumes about 0.5 mg/liter of alkalinity from lake water, thereby depressing the pH of the lake. Lake pH is of particular importance because at a pH of 6.0 or less, free aluminum becomes soluble and enters the lake water. Toxicity tests have indicated that aluminum concentrations in water which are greater than about 50 $\mu$g/liter are detrimental to aquatic life. Concern over the toxicity of aluminum in lake water is well-known to those skilled in the art, as illustrated, for example, by Gibbons, M. V. et al., "Effects of Multiphase Restoration, Particularly Aluminum Sulfate Application, on the Zooplankton Community of a Eutrophic Lake in Eastern Washington," *Journal of Freshwater Ecology*, Vol. 2, pp. 393-404 (April 1984).

To alleviate the above-described problem, sodium aluminate has been used in conjunction with aluminum sulfate. The use of sodium aluminate typically involves detailed testing to determine the pH adjustment required to negate the low pH phenomenon typical of aluminum sulfate addition. In practice, sodium aluminate is typically added to maintain lake water at a neutral pH (7.0). In the past, this has been accomplished by the addition of aluminum sulfate followed by sodium aluminate; however, this method still promotes brief episodes of toxic conditions. In addition, overdosing of sodium aluminate could cause high pH excursions (greater than a pH of 8.0) and resolubilization of the aluminum ion. Although recent equipment modifications have allowed for the simultaneous addition of aluminum sulfate and sodium aluminate, differences in product densities and application rates make operating the equipment difficult, slows the addition process, and increases the treatment costs. It would therefore be advantageous if a substitute for the use of aluminum sulfate or aluminum sulfate in combination with sodium aluminate could be found which effectively removes suspended solids and cause the precipitation and inactivation of phosphorus from lake water.

It is one object of this invention to provide a method of treating lake water to remove suspended solids and to precipitate and inactivate phosphorus by adding aluminum hydroxide sulfate to the water. It is a feature of this invention that the use of aluminum hydroxide sulfate will provide a cost effective and efficient additive for use in treating lake water as compared with using aluminum sulfate in combination with sodium aluminate. The method of this invention is advantageous in that a single additive may be used to remove suspended solids and precipitate and inactivate phosphorus contained in lake water while maintaining the pH of the water at a level of greater than 6.0, thereby avoiding the introduction of toxic amounts of soluble aluminum into the water.

SUMMARY OF THE INVENTION

This invention is directed to a method of treating lake water to remove suspended solids and to precipitate and inactivate phosphorus, comprising adding aluminum hydroxide sulfate to the water in a concentration such that the pH of the water is maintained at a level of greater than 6.0 and precipitation of suspended solids and precipitation and inactivation of phosphorus occurs. The method of this invention is advantageous in that it enables the removal of suspended solids as well as the precipitation and inactivation of phosphorus from lake water, while maintaining the pH of the lake water at a level greater than 6.0, thus preventing toxic amounts of free aluminum from becoming soluble and entering the lake water with subsequent detrimental effects on aquatic life.

DETAILED DESCRIPTION OF THE INVENTION

This invention will become apparent from the following detailed description.

As used in this description and in the appended claims, the term "lake water" refers to water typically having a turbidity of about 1-100 NTU, typically 2-50 NTU, a pH of about 5.0-9.5, typically 6-8, a color measurement of about 1-300, typically 5-20, an alkalinity (in terms of mg/L $CaCO_3$ concentration) of about 10-250, typically 20-150, and a phosphorus content of about 1-150, typically 1-10 mg/l.

As used in this description and in the appended claims, the term "aluminum hydroxide sulfate" refers to both water-soluble aluminum hydroxide sulfate and its derivatives. Aluminum hydroxide sulfate may be represented by the formula $Al_n(OH)_x(SO_4)_y \cdot m\, H_2O$ where n is greater than zero and preferably has a value in the range of 2-13, more preferably 3-6, x is greater than 0 and preferably has a value in the range of 0.60-27.30, more preferably 0.90-12.60, y is greater than 0 and preferably has a value in the range of 0.90-17.55, more preferably 1.35-8.10, and $x+y$ has a value of 3.30-33.15, preferably 4.95-15.30, and $3n = x + 2y$. Aluminum hydroxide sulfate compounds used in the method of this invention typically have a basicity of about 10-70%, preferably about 30%. The value of m is dependent upon the value of n and the resultant crystal morphology and lattice configuration. Methods of making aluminum hydroxide sulfate compounds are well known to those skilled in the art; for example, a method of making a readily soluble aluminum hydroxide compound, including aluminum hydroxide sulfate, as well as an aluminum salt is disclosed in Japanese Patent Pub. No. 55-3340 (Hosokawa et al.).

The use of aluminum hydroxide sulfate to remove suspended solids and to precipitate and inactivate phosphorus from lake water is advantageous in that aluminum hydroxide sulfate contains internal alkalinity in the form of the hydroxide groups incorporated in the formulation. Thus, alkalinity is not removed from the lake water and adequate pH levels are maintained during treatment, thereby preventing toxic aluminum excursions. It is an essential feature of the method of this invention that the aluminum hydroxide sulfate is added to lake water in a concentration such that precipitation of suspended solids and precipitation and inactivation of phosphorus occurs while the pH of the water is maintained at a level of greater than 6.0, preferably about 6.7, thereby preventing toxic amounts of free aluminum from solublizing and entering the lake water with subsequent toxic effects to aquatic life.

The method of this invention is illustrated by the following examples, which are not meant to limit the invention in any way.

EXAMPLE I

The method of this invention was compared to a conventional method of treating lake water with aluminum sulfate as follows:

A first one liter sample of lake water with an initial pH of 7.1 received an 80 mg/liter dosage of aluminum sulfate. Subsequent to addition of the aluminum sulfate, the sample had its pH level reduced to 4.0. A second one liter sample of lake water with pH 7.1 received 80 mg/liter dosage of aluminum hydroxide sulfate according to the method of this invention. The pH of this sample subsequent to addition of the aluminum hydroxide sulfate was reduced to 6.7, which is optimum for controlling toxic aluminum conditions as well as color, phosphorous and turbidity removal. The above-described dosage rates for aluminum sulfate and aluminum hydroxide sulfate also produced equivalent results in terms of suspended solids removal. Thus, Example 1 illustrates that the method of this invention has utility in removing suspended solids from lake water while maintaining the pH level of the water above 6.0, thereby preventing toxic amounts of aluminum from solublizing into the water with subsequent detrimental effects to aquatic life.

EXAMPLE II

The turbidity, $Al_2O_3$ content, pH, color, alkalinity (in terms of $CaCO_3$ content) and phosphorus content of untreated lake water were compared with identical lake water treated by a conventional treatment method using an aluminum sulfate compound (typically known to those skilled in the art as "alum") and lake water treated by the method of this invention. The results are summarized in Table 1 below.

TABLE 1

| | Lake Treatment Evaluation | | |
|---|---|---|---|
| | Alum | Aluminum Hydroxide Sulfate (30% Basic) | Lake Water |
| Additive | 75 | 77 | — |
| Conc. (PPM) | | | |
| Turbidity | 1.7 | 2.0 | 130 |
| $Al_2O_3$ | 6.3 | 6.3 | — |
| pH | 7.3 | 7.6 | 7.7 |
| Color | 7 | 10 | 40 |
| Alkalinity ($CaCO_3$) | 102.5 | 112.5 | 150 |
| P (mg/l) | <0.1 | <0.1 | <0.1 |

As illustrated by Table 1, approximately equal concentrations of alum and aluminum hydroxide sulfate (30% basic) were used to treat the lake water. Although both methods exhibited comparable results in terms of lowering turbidity and alkalinity as well as improving the color of the untreated water, the method of this invention achieved those results with less of a reduction in pH than the method employing alum. Due to the low initial phosphorus content of the lake water, no significant reduction in phosphorus in either treated water sample was observed.

Although this invention has been illustrated by reference to specific embodiments, it will be apparent to those skilled in the art that various changes and modifications may be made which clearly fall within the scope of this invention.

I claim:

1. A method of treating lake water to remove suspended solids and to precipitate and inactivate phosphorus, comprising: adding aluminum hydroxide sulfate of the formula $Al_2(OH)_x(SO_4)_y$, wherein n has a value of 2-13, x is greater than zero, and y is greater than zero, to the water in a concentration such that the pH of the water is maintained at a level of greater than 6.0 and precipitation of suspended solids and precipitation and inactivation of phosphorus occurs, said method also being effective to avoid the introduction of toxic amounts of soluble aluminum into said lake water when said lake water is treated with said aluminum hydroxide sulfate.

2. A method according to claim 1, in which the aluminum hydroxide sulfate is of the formula $Al_n(OH)_x(SO_4)_y$ where $3n = x + 2y$ and n has a value of 2-13, x has a value of 0.60-27.30, y has value of 0.90-17.99, and x+y has a value of 3.30-33.15.

3. A method according to claim 2, in which n has a value of 3-6, x has a value of 2.70-9.00, y has a value of 2.25-6.30, and x+y has a value of 5.85-13.50.

4. A method according to claim 1, in which the aluminum hydroxide sulfate has a basicity of about 10-70%.

5. A method according to claim 4, in which the aluminum hydroxide sulfate has a basicity of about 30%.

6. A method according to any one of the preceding claims, in which the pH of the water is maintained at a level of about 6.7.

7. A method of treating lake water to remove suspended solids and to precipitate and inactivate phosphorus, comprising: adding aluminum hydroxide sulfate of the formula $Al_n(OH)_x(SO_4)_y$ where n has a value of 2-13, x has a value of 0.60-27.30, y has a value of 0.90-17.55, and x+y has a concentration such that the pH of the water is maintained at a level of greater than 6.7 and precipitation of suspended solids and precipitation and inactivation of phosphorus occurs.

* * * * *